_United States Patent Office_  2,946,725
Patented July 26, 1960

2,946,725

DENTIFRICE COMPOSITIONS

Paul E. Norris, Springfield Township, Hamilton County, and Henry C. Schweizer, Sycamore Township, Hamilton County, Ohio, assignors to The Procter & Gamble Company, Cincinnati, Ohio, a corporation of Ohio No Drawing. Filed Mar. 25, 1957, Ser. No. 647,956

12 Claims. (Cl. 167—93)

This invention relates to dentifrice compositions. More particularly, it relates to dentifrices containing stannous compounds.

Dentifrices are customarily neutral or mildly alkaline; that is, when the dentifrices are slurried with water in a ratio of about 1 part of dentifrice to about 3 parts of water (a combination which approximately corresponds to the composition formed when a dentifrice is applied to the teeth), the pH value obtained by the use of conventional pH measuring instruments will be 7.0 or higher. This neutral or alkaline pH causes undesirable conditions in many dentifrices.

When certain flavors are used in neutral or alkaline dentifrices they tend to deteriorate and to be altered to less desirable flavoring substances. For example, alkaline toothpastes containing cinnamic aldehydes such as oil of cinnamon and cassia turn dark and lose their flavor upon storage. A color change is also noted in alkaline toothpastes containing vanillin. Methyl salicylate (oil of wintergreen) hydrolyzes in such dentifrices with loss in flavor. Many other natural oil esters used for flavoring present similar problems.

The presence of certain sudsing agents in alkaline dentifrices causes the dentifrices to have a "soapy" taste when used, and this is objectionable to many people. Examples of such sudsing agents include ordinary soaps, such as sodium salts of fatty acids, and substantially saturated higher aliphatic acyl amides of saturated aliphatic monoaminocarboxylic acids, such as sarcosides.

When a neutral or alkaline dentifrice is used in brushing the teeth mucoproteins present in the mouth tend to adhere to the surface of the teeth in the form of a slimy film and are difficult to remove. When a dentifrice is used which has a pH of 6.0 or less the mucoproteins lose this adhesive quality, thus aiding in their removal from the surface of the teeth by brushing or rinsing.

The pH of dentifrices may be changed by adding small amounts of alkaline or acid materials. Although the addition of such materials may immediately adjust the pH to a desired value, it has been found that the pH will tend to change as the dentifrice ages.

It has now been found that the incorporation in dentifrices of a slightly soluble stannous compound will provide a means for maintaining the pH of the dentifrice below 6.0, and will furnish a new and novel means for overcoming the problems of flavor, taste and film formation as heretofore set forth.

One of the most practicable methods of administering fluorine to the teeth is by means of a dentifrice composition. Fluorine is usually incorporated in dentifrices by means of fluorine-containing compounds which dissociate in aqueous solutions to yield fluoride ions. Such dentifrices, as abundantly shown in the prior art, have been found to reduce substantially the solubility of tooth enamel in acid solutions similar to those formed in the mouth. In addition, clinical tests of certain fluorine-containing toothpastes have shown a significant reduction in dental caries for persons using these toothpastes.

The efficacy of fluorine-containing dentifrices in diminishing the incidence and limiting the severity of carious lesions in teeth is greatly improved if the dentifrices provide stannous ions in addition to fluoride ions during application to the teeth. The stannous ions in conjunction with the fluoride ions enter into some reaction with the enamel surfaces of teeth, thereby making the tooth enamel resistant to solution in acids present in the mouth. This resistance of the enamel to solution in acid tends to lower the incidence of caries.

The incorporation of water-soluble stannous compounds in a toothpaste has presented a problem, since the stannous ions which are formed in the toothpaste tend to react with other components of the toothpaste to form insoluble compounds such as stannous hydroxide or stannous orthophosphate, or to form complexes with other components of the toothpaste. This is particularly true when the pH of the toothpaste is greater than about 6.0 The formation of these insoluble compounds reduces the effective amount of stannous ions in the toothpaste and, as a result, the ability of the fluorine-containing toothpastes to reduce caries is greatly lowered. Accordingly, the practice of this invention is particularly desirable in fluorine-containing toothpastes.

The slightly soluble stannous compounds of this invention also provide a "reservoir" of stannous tin, which will slowly release stannous ions over a period of time, and which will provide a means to replace any stannous ions removed from the dentifrice by the formation of insoluble compounds. By incorporation of this stannous "reservoir" in a fluorine-containing dentifrice the effectiveness of the dentifrice in reducing caries can be retained for a much longer period of aging time than has been possible heretofore.

Accordingly, it is an object of this invention to provide a dentifrice whose pH will remain below 6.0 during extended periods of aging.

A further object is to provide a dentifrice in which may be used flavoring materials which deteriorate in neutral or alkaline media.

Another object is to provide a dentifrice free from a soapy taste.

Another object is to provide a dentifrice which will more effectively clean the teeth and remove mucoprotein film than has been possible with prior art neutral or alkaline dentifrices.

Another object is to provide a dentifrice containing water-soluble stannous and fluorine compounds which will reduce dental caries.

Other objects and advantageous features will be apparent from the following specification.

In general, this invention comprises a dentifrice containing a slightly soluble stannous compound, said stannous compound being capable of supplying at least 10 but not more than 1000 parts per million of stannous ions when in association with water, and being present in said dentifrice in an amount sufficient to provide an excess of said stannous compound in undissociated form.

A preferred form of this invention, which is capable of lowering the incidence of dental caries when applied to the teeth, comprises a toothpaste comprising water, fluoride ions, stannous ions, and an undissociated tin-containing compound which, upon removal of stannous ions is progressively dissociable to maintain the concentration of stannous ions in said toothpaste, said toothpaste having a pH of from 3.5 to 6.0.

A preferred group of slightly soluble stannous compounds suitable for use in dentifrices of this invention are stannous condensed phosphates. A condensed phosphate may be defined as a phosphate salt which when written as a combination of oxides will have a ratio of the cationic oxides, including water of composition, to the anionic oxides of less than three. Stannous pyrophosphate and stannous metaphosphate are examples of these stannous condensed phosphates. Other slightly soluble stannous compounds which can be used include stannous tartrate, stannous maleate, and stannous citrate.

Flourine-containing compounds suitable for use in dentifrices of this invention, and which can be used to provide fluoride ions, include any fluorine-containing compounds which are capable of supplying at least 25 parts per million of fluoride ions, or of labile ions which will form fluoride ions, when in association with water. For the purposes of this invention, these compounds will hereinafter be referred to as "water-soluble fluoride compounds."

The quantity of the water-soluble fluoride compounds which must be used for efficacious results in the fluorine-containing dentifrices of this invention should be an amount equivalent to at least 25 parts of fluoride ions per million parts of dentifrice. Extremely large amounts of fluoride ions do not appreciably increase the caries reduction properties of the dentifrice and may cause it to have toxic effects. Accordingly, the dentifrices of this invention should not contain a total of more than 4000 parts ionized and un-ionized fluorine per million parts of dentifrice, and preferably not more than about 1000 parts per million.

Examples of suitable water-soluble fluoride compounds include $SnF_2$, $NaF$, $SnF_4$, $KF$, $InF_3$, $PdF_2$, $FeF_2$, and $LiF$. The term "fluoride compounds" is also intended to encompass more complex water-soluble fluorine-containing salts such as fluosilicates, i.e., $Na_2SiF_6$, fluozirconates, i.e, $CaZrF_6$, $Na_2ZrF_6$, $K_2ZrF_6$, fluostannites, i.e., $KSnF_3$, fluoborates, i.e., $NaBF_4$, and fluotitanates. Other suitable fluoride compounds include mixed halides such as the stannous chlorofluorides $SnClF$ and $Sn_2ClF_3$. Mixtures of fluoride compounds can be used.

As has been heretofore stated, dentifrices comprising fluorine-containing compounds preferably should also contain materials which will provide a source of stannous ions during use.

Both fluoride ions and stannous ions can be provided by the use of a stannous fluoride. Stannous ions can also be supplied by the addition to a dentifrice of a water-soluble, non-fluorine-containing stannous compound. Examples of such compounds include stannous sulfate, stannous chloride, and stannous gluconate.

Soluble stannous compounds do not always serve to maintain the pH of the dentifrices at a desirable level. They also do not serve as a "reservoir" of stannous tin. Because of their greater solubility and ionization, stannous ion concentration may tend to decrease by reaction with other components of the dentifrices to form highly insoluble compounds during aging, thus lessening the desirable characteristics of fluorine-containing dentifrices. The presence of a small amount of a true stannous "reservoir" compound in a toothpaste, as hereinbefore mentioned, will serve to replenish the stannous ions when the amount becomes too small. If the water-soluble fluorine compound does not contain any stannous ions, and no other water-soluble stannous compounds are present in a toothpaste, stannous ions may be supplied from initial dissociation of the stannous "reservoir."

The stannous "reservoir" must be present in a dentifrice in an amount sufficient to provide an excess of undissociated compound which will not immediately dissociate to form stannous ions when associated with water. In a toothpaste, the excess of dissociated stannous "reservoir" must be sufficiently great to dissociate so as to maintain a concentration of at least 10 parts per million parts of dentifrice at any one time, as the dentifrice becomes depleted of stannous ions.

If the pH of a dentifrice is too low, the foaming power of the sudsing agents may be undesirably low. Also, other dentifrice components such as the condensed phosphates, if used as abrasives, may hydrolyze and form soluble ions which in turn will form insoluble compounds, removing desirable active ions from solution. If the pH is too high, the stannous tin may form complexes which will not dissociate to form stannous ions. Acceptable toothpastes can have pH values ranging from 3.5 to 6.0. A preferred pH range is from 4.0 to 5.5.

Dentifrices desirably should also contain abrasive materials. The abrasives should be relatively insoluble and should be stable at the pH ranges herein specified. They should not be too abrasive so as to scratch the surface of the teeth or unduly abrade the dentin, but they must have sufficient abrading power to clean the teeth. In the practice of this invention any conventional dental abrasives can be used which have these properties, and such abrasives include calcium orthophosphates, both anhydrous and hydrated, and alumina.

A preferred class of abrasives for use in fluorine containing dentifrices of this invention are insoluble condensed phosphates. Examples of such insoluble condensed phosphates include calcium pyrophosphate, insoluble calcium metaphosphate, and insoluble sodium metaphosphate. Stannous condensed phosphates, such as stannous metaphosphate or stannous pyrophosphate, can be used as a part or all of the abrasive, thus serving two functions. Mixtures of abrasives can be used. The total amount of abrasive materials in dentifrices of this invention can range from 0.5% to 99.5%, by weight of the dentifrice. Preferably, toothpastes contain from 20.0% to 60% by weight, and tooth powders contain from 60% to 99.5%, by weight.

Dentifrices conventionally contain sudsing agents, although these are not critical in the practice of the present invention. Any of the commonly used sudsing agents can be used if they are reasonably stable and form suds within the pH range of the dentifrices of this invention. Examples of suitable sudsing agents include, but are not limited to, water-soluble alkyl and alkyl ether sulfates and sulfonates having alkyl groups of from about 8 to 18 carbon atoms, water-soluble salts of sulfonated monoglycerides of fatty acids having from 10 to 18 carbon atoms, water-soluble salts of sulfated fatty alcohols having from 10 to 18 carbon atoms, salts of fatty acid amides of taurines such as sodium-N-methyl-N-palmitoyl tauride, salts of fatty acid esters of isethionic acid, and substantially saturated aliphatic acyl amides of saturated aliphatic monoaminocarboxylic acids having 2 to 6 carbon atoms and in which the acyl radical contains 12 to 16 carbon atoms, such as sodium N-lauroyl sarcoside. Mixtures of two or more sudsing agents can also be used.

Sudsing agents in an amount of from 0.5% to 5.0%, by weight of dentifrice, can be used in dentifrices of this invention.

In preparing toothpastes, it is necessary to add some thickening material. Preferred thickening agents are water-soluble salts of cellulose ethers such as sodium carboxy-methyl cellulose and sodium carboxymethyl hydroxyethyl cellulose. Natural gums such as gum karaya, gum arabic, and gum tragacanth may be used as thickeners but are less preferred since they may tend to cause undesirable odor or taste in the toothpastes. Colloidal magnesium aluminum silicate or finely divided silica can be used as a part of the thickening agent for improvement in texture. Thickening agents in an amount of from 0.5% to 5.0%, by weight of toothpaste, can be used to form a satisfactory toothpaste.

Suitable humectants include glycerine, sorbitol, and other polyhydric alcohols. The humectants may comprise up to about 35% of the toothpaste composition.

Dentifrices may additionally contain small amounts of flavorings, such as oil of wintergreen, oil of peppermint, oil of spearmint, oil of sassafras, and oil of anise. Small amounts of sweetening agents such as saccharin, dextrose, levulose, and sodium cyclamate are also conventionally added to dentifrices.

The ability of a fluorine-containing dentifrice to reduce dental caries can be indicated by measurement of the reduction of enamel solubility in acid after teeth are treated with a dentifrice. These tests are performed as follows:

Cleaned whole teeth are exposed to irradiation by neutron bombardment whereby some of the phosphorous and calcium in the calcium hydroxyapatite of the enamel is transformed to $\beta$-emitting $P^{32}$ and $Ca^{45}$. Immediately after exposure it is desirable to wait about a week to permit the gamma-emitting $Na^{24}$ to decay. The radioactive teeth are then etched by an approximately 0.1 N solution of lactic acid-sodium lactate which has been adjusted with NaOH to a pH of 4.5 at room temperature. A fresh portion of solution is used for each etching of the teeth. The amount of phosphorus and calcium etched from the teeth can be calculated by measuring the increase in radioactivity of the etching solution. An initial etching is performed until the rate of etching of the tooth enamel becomes constant. The teeth are then etched for 15 minutes and the amount of enamel removed is measured. A slurry is made containing 1 part of dentifrice thoroughly dispersed in 3 parts of water. This slurry is centrifuged, and the supernatant liquid is decanted. The teeth previously etched are immersed in 20 ml. of this liquid for five minutes while the liquid is agitated. The teeth are then washed and exposed for 15 minutes to the etching solution in the same manner as before. The amount of enamel dissolved from the teeth is again determined, and the enamel solubility reduction, hereinafter referred to as ESR, is calculated as a percentage based on the amount of enamel dissolved from the teeth prior to treatment with the dentifrice.

The following examples illustrate this invention with greater particularity.

*Example I*

The following toothpaste compositions were prepared, and their pH values were measured both immediately after making and also after the indicated time intervals.

| Components | Percent composition | | | |
|---|---|---|---|---|
| | A | B | C | D |
| Calcium pyrophosphate | 40.00 | 39.00 | 40.00 | 39.00 |
| Sodium carboxymethyl cellulose | 1.20 | 1.20 | 1.20 | 1.20 |
| Magnesium aluminum silicate | 0.40 | 0.40 | 0.40 | 0.40 |
| Sorbitol | 20.00 | 20.00 | 20.00 | 20.00 |
| Glycerine | 10.00 | 10.00 | 10.00 | 10.00 |
| Sodium coconut monoglyceride sulfonate | 0.81 | 0.81 | 0.81 | 0.81 |
| Sodium lauryl sulfate | 0.70 | 0.70 | 0.70 | 0.70 |
| Saccharin | 0.12 | 0.12 | 0.12 | 0.12 |
| Stannous pyrophosphate | | 1.00 | | 1.00 |
| HCl (37%) | | | 0.15 | 0.13 |
| Water | Bal. | Bal. | Bal. | Bal. |
| pH Values | | | | |
| Fresh paste | 6.43 | 4.9 | 4.91 | 4.90 |
| After 7 weeks aging | 6.52 | ¹ 5.1 | 5.31 | 4.35 |

¹ After 6 weeks' aging.

As can be seen by the above results, the addition of stannous pyrophosphate to a non-acidified paste lowered the pH and maintained the pH at a value below 6.0 during aging. Adding HCl to the paste initially lowered the pH but then it began to increase upon aging. The pH value decreased during aging in the acidified paste to which stannous pyrophosphate was added.

*Example II*

A basic toothpaste composition was prepared having the following formula:

| Component | Amount (percent) |
|---|---|
| Abrasive (Calcium Pyrophosphate) | 42.0. |
| Thickening Agents (Sodium carboxymethyl-cellulose and magnesium aluminum silicate) | 1.5. |
| Humectant: | |
| 70% Sorbitol in Water | 20.0. |
| Glycerine | 10.0. |
| Sudsing Agents (Sodium coconut monoglyceride sulfonate and sodium lauryl sulfate) | 1.5. |
| Flavoring | Minor Amounts. |
| Sweetening (Saccharin) | Do. |
| Water | 24.0. |

Test toothpastes were made by adding the following components:

A. Basic paste plus 0.4% $SnF_2$.

B. Same as paste A except it contained 1.0% stannous pyrophosphate which replaced an equal amount of abrasive.

C. Same as paste A except that it contained 2.0% stannous pyrophosphate which replaced an equal amount of abrasive.

D. Same as paste A except that it contained 3.0% stannous pyrophosphate which replaced an equal amount of abrasive.

E. Same as the basic paste except that it contained 1.0% stannous pyrophosphate which replaced an equal amount of abrasive.

F. Basic paste plus 0.22% sodium fluoride.

G. Same as paste F except that it contained 1% stannous pyrophosphate which replaced an equal amount of abrasive.

(In each of these pastes the pH was initially adjusted to between 4.0 and 5.5.)

The average percent reductions in enamel solubility were calculated in the manner previously described for each of these pastes at indicated time intervals, using several determinations to obtain each average reduction value. These average reductions and the pH values were found to be as follows (the higher ESR figures indicate greater effectiveness of the toothpaste in reducing dental caries):

| Paste | After 1 Wk. | pH | After 2 Wks. | pH | After 1 Mo. | pH | After 2 Mos. | pH | After 3 Mos. | pH | After 6 Mos. | pH |
|---|---|---|---|---|---|---|---|---|---|---|---|---|
| A | 32.0 | 4.9 | (*) | | (*) | | 24.0 | 5.0 | (*) | | 19.0 | 5.3 |
| B | 45.0 | 4.5 | (*) | | (*) | | 35.0 | 4.9 | (*) | | 29.0 | 5.1 |
| C | 40.0 | 4.2 | (*) | | (*) | | 44.0 | 4.2 | (*) | | 38.0 | 3.9 |
| D | (*) | | (*) | | (*) | | 42.0 | 4.1 | (*) | | 35.0 | 3.7 |
| E | (*) | | (*) | | 25.0 | 4.3 | (*) | | 15.0 | 4.3 | (*) | |
| F | (*) | | 19.0 | 4.8 | (*) | | (*) | | 21.0 | 4.9 | (*) | |
| G | (*) | | 33.0 | 4.3 | (*) | | (*) | | 32.0 | 4.5 | (*) | |

(* No readings were taken at these time intervals.)

The foregoing example clearly shows the superiority of dentifrices containing both a water-soluble fluorine-containing compound and a relatively insoluble stannous compound when compared with dentifrices containing either component singly, and also the effectiveness in reducing tooth enamel solubility of fluorine-containing toothpastes containing slightly soluble stannous compounds.

*Example III*

A paste was prepared having a composition similar to that of paste A in Example II except that it contained 10% stannous pyrophosphate which replaced an equal amount of abrasive. In ESR values this paste was comparable to pastes B, C, and D of Example II.

*Example IV*

A paste was prepared having a composition similar to that of paste A in Example II except that it contained 30% stannous pyrophosphate which replaced an equal amount of abrasive. In ESR values this paste was also comparable to pastes B, C, and D of Example II.

The following examples describe other toothpastes which are illustrative of this invention:

*Example V*

A toothpaste was made having the following composition:

| | Percent |
|---|---|
| Calcium pyrophosphate | 39.00 |
| Stannous fluoride | 0.40 |
| Stannous tartrate | 1.00 |
| Sorbitol | 20.00 |
| Sodium lauryl sulfate | 0.70 |
| Sodium coconut monoglyceride sulfonate | 0.81 |
| Glycerine | 10.00 |
| Sodium carboxymethyl cellulose | 1.20 |
| Magnesium aluminum silicate | 0.40 |
| Flavor | 0.85 |
| Color | 0.62 |
| Saccharin | 0.12 |
| Water | Balance |

The pH and ESR values for this toothpaste at the indicated time intervals were as follows:

| Time After Making | pH | ESR |
|---|---|---|
| Fresh | 4.21 | (not measured.) |
| 1 Wk. (120° F.) | 4.25 | 42.9 |
| 5 Wks. (room temperature) | 4.28 | 358 |

Two other examples of toothpastes of this invention which will give comparable results in reducing the solubility of tooth enamel in acid are as follows:

*Example VI*

A toothpaste similar to the basic paste of Example II except that it contains 1.0% stannous pyrophosphate which has replaced an equal amount of abrasive, and additionally contains 0.22% NaF and 0.5% $SnSO_4$.

*Example VII*

A toothpaste similar to the basic paste of Example II except that it contains 1.0% stannous pyrophosphate which has replaced an equal amount of abrasive, and additionally contains 1.0% SnClF.

This application is a continuation-in-part of our co-pending application U.S. Serial No. 580,434, filed April 25, 1956, and now abandoned.

What is claimed is:

1. A dentifrice containing a stannous compound, said stannous compound being difficultly soluable but capable of dissolving to supply at least 10 but not more than 1000 parts per million of stannous ions when in association with water, and being present in said dentifrice in an amount sufficient to provide said stannous compound in undissolved and undissociated form, said dentifrice having a pH of from 3.5 to 6.0.

2. A dentifrice according to claim 1, wherein the stannous compound is stannous tartrate.

3. A dentifrice according to claim 1, wherein the stannous compound is stannous pyrophosphate.

4. A dentifrice according to claim 1, wherein the stannous compound is stannous metaphosphate.

5. The method of maintaining a dentrifice at a pH value of from 3.5 to 6.0 comprising the step of adding to said dentifrice a stannous compound, in an amount sufficient to provide said stannous compound in undissociated form, the said stannous compound being capable of supplying at least 10 but not more than 1000 parts per million of stannous ions when in association with water.

6. The method according to claim 5 wherein the stannous compound is stannous tartrate.

7. The method according to claim 5 wherein the stannous compound is stannous pyrophosphate.

8. The method according to claim 5 wherein the stannous compound is stannous metaphosphate.

9. A toothpaste comprising water, fluoride ions resulting from the dissociation of a water-soluble, fluorine-containing compound present in an amount sufficient to provide at least 25 parts of fluoride ions per million parts of toothpaste, the total amount of ionized and un-ionized fluorine not exceeding 4000 parts per million parts of toothpaste, at least 10 parts of stannous tin ions per million parts of toothpaste and a stannous compound capable of supplying at least 10 but not more than 1000 parts per million of stannous ions when in association with water and being present in said dentifrice in an amount sufficient to provide said stannous compound in undissociated form, said toothpaste having a pH of from 3.5 to 6.0.

10. A toothpaste according to claim 9, wherein the tin compound is stannous pyrophosphate and the fluorine-containing compound is stannous fluoride.

11. A toothpaste according to claim 9, wherein the tin compound is stannous tartrate.

12. A toothpaste according to claim 9 wherein the tin compound is stannous metaphosphate.

References Cited in the file of this patent

UNITED STATES PATENTS

| 1,467,024 | Bergve | Sept. 4, 1923 |

FOREIGN PATENTS

| 654,473 | Great Britain | June 20, 1951 |

OTHER REFERENCES

"Handbook of Chem. and Physics," 31st ed., 1949, pp. 536–537, Chem. Rubber Pub. Co., Cleveland, Ohio.

Bibby: J.A.D.A., vol. 34, January 1947, pp. 26–32.

Phillips et al.: J.A.D.A., vol. 40, May 1950, pp. 513–519.

Muhler et al.: J.A.D.A., November 1950, pp. 529–535.

Muhler et al.: J.D. Res, vol. 34, February 1955, pp. 68–72.

"Progress in Leather Science," 1920–45, Br. Leather Mfrs. Res. Asso., London, 1948, pp. 173–174.